United States Patent
Beringer

(10) Patent No.: US 6,851,549 B1
(45) Date of Patent: Feb. 8, 2005

(54) PRODUCT CAPTURING CHAIN CONSTRUCTION

(76) Inventor: Bernie Beringer, 594 Buckingham Rd., Gray, TN (US) 37615

(*) Notice: Subject to any disclaimer, the term of this patent is extended or adjusted under 35 U.S.C. 154(b) by 0 days.

(21) Appl. No.: 10/652,399

(22) Filed: Aug. 28, 2003

(51) Int. Cl.[7] ............................................. B65G 17/38
(52) U.S. Cl. ........................... 198/867.15; 198/803.14; 198/853
(58) Field of Search ........................ 198/867.01, 867.14, 198/867.15, 803.13, 867.12, 803.14, 850, 853, 690.2

(56) References Cited

U.S. PATENT DOCUMENTS

| | | | | |
|---|---|---|---|---|
| 2,954,113 A | * | 9/1960 | Hibbard | 198/867.15 |
| 4,220,052 A | * | 9/1980 | Sheldon | 198/853 |
| 4,582,193 A | * | 4/1986 | Larsson | 198/867.15 |
| 5,096,050 A | * | 3/1992 | Hodlewsky | 198/853 |
| 5,101,966 A | * | 4/1992 | Lapeyre | 148/803.14 |
| 5,219,065 A | * | 6/1993 | Hodlewsky et al. | 198/853 |
| 5,429,226 A | * | 7/1995 | Ensch et al. | 198/803.14 |
| 5,601,182 A | * | 2/1997 | Tidland | 198/867.14 |

* cited by examiner

Primary Examiner—James R. Bidwell

(57) ABSTRACT

A product gripping device adapted for mounting on a link of a product capturing chain, the device including a base plate having on its lower side a connector structure for attaching the plate to a chain, and having two opposing posts extending upwardly from opposite ends of the top of the plate, wherein the posts are apertured for receiving a pin passing thru a bore of a resilient gripping member interposed between the posts for retaining the member tightly on the top of the plate.

15 Claims, 1 Drawing Sheet

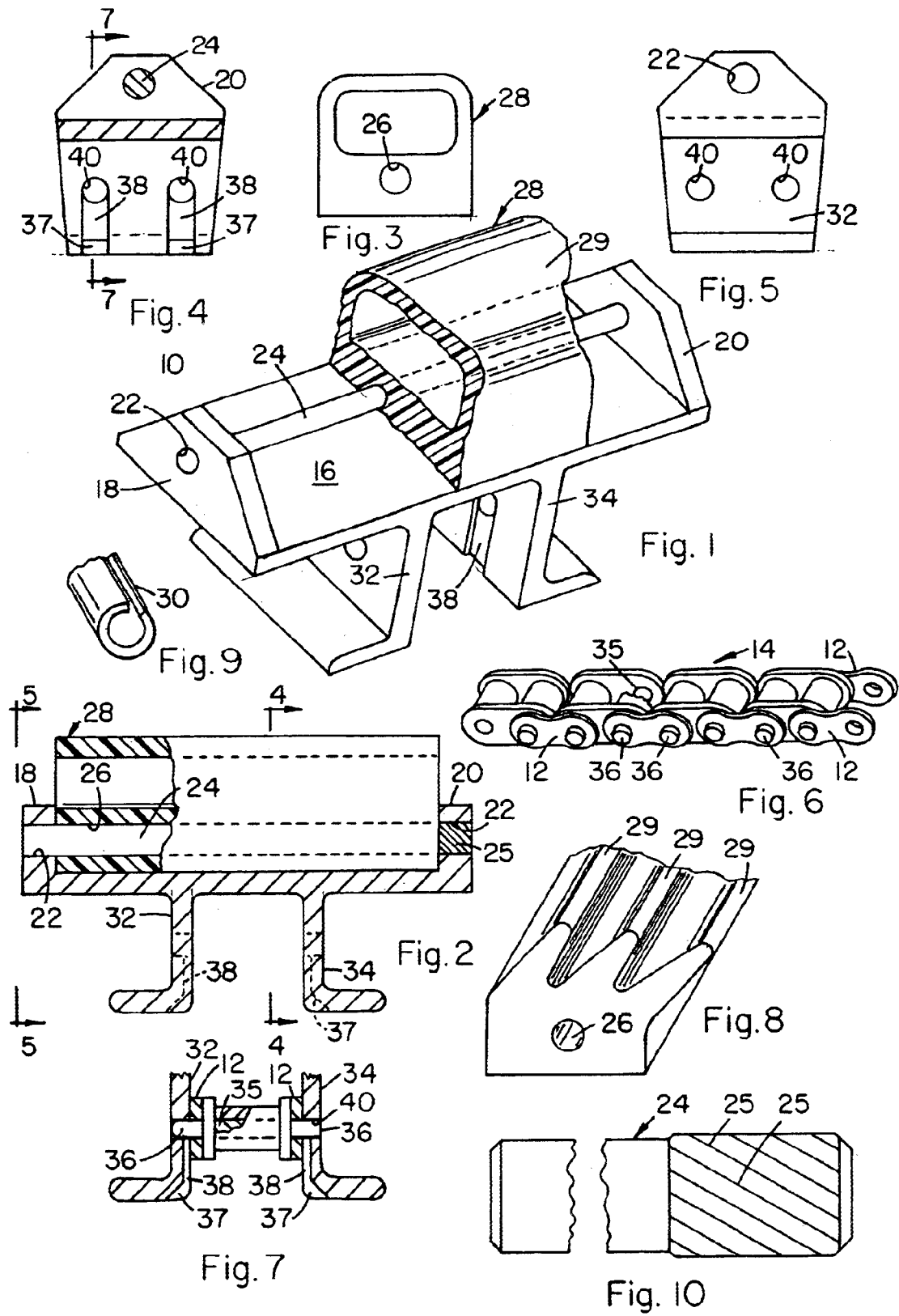

PRODUCT CAPTURING CHAIN CONSTRUCTION

BACKGROUND OF THE INVENTION

1. Field

This invention relates to unique and improved product gripping devices for use on product capturing or clamping conveyor chain wherein the chains are typically made up of roller base chain links with a snap-on gripping device, usually on each link and comprising a metal or plastic base plate for quick attachment to the link, wherein the plate has a product gripping member of resilient material such as rubber, urethane, elastomer or the like fixed onto the top thereof. Two such chains typically run on edge and parallel to each other with the attached gripping members facing each other. The products are picked up in their path by squeezing them between the opposing gripping members as the chains are made to converge. The chains are able to flex within a plane substantially containing the longitudinal axes of the grippers in order to raise or lower the product being conveyed, and then the two chains separate, thereby setting the products on a conveyor or platform at a different level. See FIG. 12 of U.S. Pat. No. 4,629,063 for the general layout of a product capturing chain which might be used commercially.

2. Prior Art

The present invention improves on present capturing chains as many of the gripping members fall out of the present chain assemblies during production or commercial use by being struck by various means or by pathway restrictions causing considerable loss of valuable time repairing and installing the grippers that were pulled free and dropped to the floor. Such prior product gripping devices are shown in U.S. Pat. Nos. 4,629,063 and 4,809,846, the disclosures of which are hereby incorporated herein in their entirety.

SUMMARY OF THE INVENTION

The above manufacturing and commercial use problems are eliminated by the present invention thru the discovery of simple but effective gripping device construction which is defined in its broad embodiment as a product gripping device adapted for mounting on a link of a product capturing chain, said device having a base plate including two opposing posts extending upwardly from opposite ends of the top of the plate, wherein the posts are apertured for receiving a retaining pin passing thru a bore of a resilient gripping member for retaining the member tightly on the plate. Preferably at least one of the ends of the pin is press fitted or otherwise firmly secured in the aperture of a post. It is noted that the terms "upwardly", "lower", "top" and "bottom", and the like employed herein are in reference to their positions or postures shown in the drawings.

BRIEF DESCRIPTION OF THE DRAWINGS

The invention and its objects and advantages will further become evident from the following description and drawings wherein the figures are not necessarily drawn to scale or relative proportions of the structures shown therein, and wherein:

FIG. 1 is a perspective view of the present gripping device with portions of its structural elements broken away for clarity;

FIG. 2 is a side view of the device of FIG. 1 with portions in longitudinal axial cross-section;

FIG. 3 is an end view of the gripping member of FIGS. 1 and 2;

FIG. 4 is a cross-sectional view taken along line 4—4 of FIG. 2 with the gripping member removed;

FIG. 5 is an end view taken in the direction of line 5—5 in FIG. 2 with the gripping member removed;

FIG. 6 is a perspective view of a typical roller chain to which the present device is adapted to be attached;

FIG. 7 is a cross-sectional view taken along line 7—7 in FIG. 4 and showing the snap-on attachment of the present device to the chain of FIG. 6;

FIG. 8 is a perspective view of a portion of a variation of the gripping member configuration;

FIG. 9 is a perspective view of a steel split pin which is an alternative to the retaining pin of FIGS. 1 and 2; and FIG. 10 is a side view of a preferred retaining pin configuration.

DETAILED DESCRIPTION

Referring to the drawings and with particular reference to the claims herein, the present gripping device generally designated 10 which is adapted for mounting on a link 12 of a product capturing chain 14 comprises a base plate 16 including two opposing ends or posts 18 and 20 extending upwardly from opposite ends of the plate, wherein the posts are apertured at 22 for receiving a retaining pin 24 passing thru a bore 26 of a resilient gripping member 28 for retaining the member tightly on the plate. Preferably, at least one of the ends of the pin is press fitted or otherwise firmly secured in the aperture 22 of a post. The gripping member is preferably of a tough but resilient elastomeric material such as conventionally employed on product capturing conveyors.

The bore 26 should be only as large in diameter as is necessary to allow easy insertion of the retaining pin therethrough. In FIG. 9 a chamfered end steel split pin 30 is shown and can be used in place of the solid stainless steel pin 24. For pin 24 it is preferred to slightly enlarge and spline as at 25 a portion of about 0.3–0.4 in. in length of an end thereof as shown in FIG. 10, preferably angularly, such that the end will bite into the undersized diameter (e.g., about 0.010 in. undersized) aperture rim in a screw-like fashion. The other aperture is, of course, of a diameter which allows the normal pin end to slide therethrough. Likewise with the split pin, one of the apertures is undersized whereby the pin end is highly compressed when forced thereinto. Alternatively, the pin may comprise a long bolt and a lock nut or the equivalent, or one of the apertures is threaded to receive a threaded end portion of a bolt.

The snap-on attachment of the present device to the roller chain is made by pushing (inserting) the chain link 12 between the feet 32, 34 of the device with the chain link roller shaft 35 ends 36 first engaging in chamfered lead-in portions 37 of guide slots 38 and then riding up the slots with the pin ends 36 engaging the bottoms of the slots and resiliently flexing the feet apart until shaft holes 40 are reached and the feet are allowed to snap back into the posture shown in FIG. 7 wherein the shaft ends 36 pop into holes 40.

The product contacting portions 29 of the gripping member 28 can be of any configuration and flexibility in order to meet the allowable contact pressure requirements dictated by the type of product to be clamped.

This invention has been described in detail with particular reference to preferred embodiments thereof, but it will be understood that variations and modifications will be effected within the spirit and scope of the invention.

I claim:

1. A product gripping device adapted for mounting on a link of a product capturing chain, said device comprising a base plate including two opposing posts extending upwardly from opposite ends of a top of said plate, wherein an aperture is formed thru each post for receiving a retaining pin passing thru a bore of a resilient gripping member for retaining the member tightly on the top of said plate, said pin having a substantially uniform diameter such that it can be removed from said posts and gripping member by being driven axially thru said apertures and bore, and wherein connector means is provided on the bottom of said plate for securing said device to roller shafts of said link.

2. The device of claim 1 wherein said pin is stainless steel and an end portion thereof is slightly enlarged in diameter such that when forced into one of said apertures a tight press fit is achieved.

3. The device of claim 2 wherein the outer surface of said end portion of said pin is splined such as to bite into the rim of the aperture.

4. The device of claim 1 wherein said pin is a steel split pin.

5. The device of claim 1 wherein said pin is substantially uniform in diameter throughout its length and one of said apertures is undersized to allow an end of said pin to be press fitted therein.

6. A product gripping device adapted for mounting on a link of a product capturing chain, said device comprising a base plate having a bottom, a top surface and two opposing support posts extending upwardly from opposite ends of said plate, wherein an aperture is formed thru each post and receives a retaining pin of substantially uniform diameter wherein at least one end of said pin is press fitted into one of said apertures, a resilient gripping member is mounted on said pin which retains said member tightly on said top surface of said plate, and wherein connector means is provided on the bottom of said plate for securing said device to roller shafts of said link.

7. The device of claim 1 wherein said pin is steel and an end portion thereof is slightly enlarged in diameter such that when forced into one of said apertures a tight press fit is achieved.

8. The device of claim 7 wherein the outer surface of said end portion of said pin is splined such as to bite into the rim of the aperture.

9. The device of claim 1 wherein said pin is a steel split pin.

10. The device of claim 6 wherein said one of said apertures is undersized relative to said pin whereby said one end of said pin is press fitted into said one of said apertures.

11. A product gripping device mounted on a link of a product capturing chain, said device comprising a base plate including two opposing posts extending upwardly from opposite ends of a top of said plate, wherein an aperture is formed thru each post and receiving a retaining pin passing thru a bore of a resilient gripping member and retaining said member tightly on the top of said plate, said pin having a substantially uniform diameter such that it can be removed from said posts and gripping member by being driven axially thru said apertures and bore, and wherein connector means is provided on the bottom of said base plate for securing said device to roller shafts of said link.

12. The device of claim 11 wherein said pin is stainless steel and an end portion thereof is slightly enlarged in diameter such that it is forced into one of said apertures to achieve a tight press fit.

13. The device of claim 11 wherein the outer surface of said pin is splined such as to bite into the rim of said aperture.

14. The device of claim 11 wherein said pin is a steel split pin.

15. The device of claim 11 wherein said pin is substantially uniform in diameter throughout its length and one of said apertures is undersized such that an end of said pin is press fitted therein.

* * * * *